United States Patent
Nam et al.

(10) Patent No.: US 10,492,157 B2
(45) Date of Patent: Nov. 26, 2019

(54) METHOD AND APPARATUS FOR SYSTEM INFORMATION DELIVERY IN ADVANCED WIRELESS SYSTEMS

(71) Applicant: Samsung Electronics Co., Ltd., Gyeonggi-do (KR)

(72) Inventors: Young-Han Nam, Plano, TX (US); Vikram Chandrasekhar, Mountain View, CA (US); Li Guo, Allen, TX (US); Hao Chen, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 15/856,752

(22) Filed: Dec. 28, 2017

(65) Prior Publication Data

US 2018/0192383 A1    Jul. 5, 2018

Related U.S. Application Data

(60) Provisional application No. 62/442,237, filed on Jan. 4, 2017, provisional application No. 62/507,924, filed on
(Continued)

(51) Int. Cl.
*H04W 56/00*   (2009.01)
*H04W 72/04*   (2009.01)
(Continued)

(52) U.S. Cl.
CPC ......... *H04W 56/001* (2013.01); *H04L 5/0044* (2013.01); *H04L 5/0053* (2013.01);
(Continued)

(58) Field of Classification Search
CPC ........ H04L 5/00; H04L 5/0007; H04W 72/04; H04W 72/12; H04W 56/001; H04W 72/042; H04W 72/044

See application file for complete search history.

(56) References Cited

U.S. PATENT DOCUMENTS

2010/0075705 A1   3/2010  van Rensburg et al.
2013/0155891 A1*  6/2013  Dinan .................. H04B 7/0456
                                                370/252

(Continued)

OTHER PUBLICATIONS

J. Smee; "5 wireless inventions that are making 5G NR—the global 5G standard—a reality"; Qualcomm; Dec. 20, 2016; 8 pages.
(Continued)

*Primary Examiner* — Kyaw Z Soe

(57) ABSTRACT

A method of user equipment (UE) for system information transmission in a wireless communication system is provided. The method comprises receiving, from a base station (BS), a synchronization signal/physical broadcasting channel (SS/PBCH) block comprising a PBCH that carries a master information block (MIB) including an SIB1 CORESET configuration, wherein the SIB1 CORESET configuration comprises a frequency location, a number of resource blocks (RBs) comprising an SIB1 CORESET associated with the SS/PBCH block, and information of time domain resources of the SIB1 CORESET, determining an initial active bandwidth part (BWP) comprising the frequency location, the number of RBs comprising the SIB1 CORESET, and a numerology of remaining minimum system information (RMSI), and receiving, from the BS, a physical downlink control channel (PDCCH) mapped to at least one time-frequency resource within the SIB1 CORESET, wherein the PDCCH includes scheduling information of a physical downlink shared channel (PDSCH) containing an SIB 1.

20 Claims, 11 Drawing Sheets

Related U.S. Application Data on May 18, 2017, provisional application No. 62/520,235, filed on Jun. 15, 2017, provisional application No. 62/556,293, filed on Sep. 8, 2017.

(51) Int. Cl.
  *H04W 72/12* (2009.01)
  *H04L 5/00* (2006.01)
  *H04W 88/08* (2009.01)
  *H04W 88/02* (2009.01)

(52) U.S. Cl.
  CPC ......... *H04L 5/0092* (2013.01); *H04W 72/042* (2013.01); *H04W 72/044* (2013.01); *H04W 72/12* (2013.01); *H04L 5/0007* (2013.01); *H04W 88/02* (2013.01); *H04W 88/08* (2013.01)

(56) References Cited

U.S. PATENT DOCUMENTS

| | | |
|---|---|---|
| 2013/0223251 A1 | 8/2013 | Li et al. |
| 2013/0301454 A1 | 11/2013 | Seol et al. |
| 2016/0128011 A1 | 5/2016 | Yang et al. |
| 2018/0110019 A1* | 4/2018 | Ly .................. H04W 56/001 |

OTHER PUBLICATIONS

Foreign Communication from Related Counterpart Application; PCT Patent Application No. PCT/KR2018/000200; International Search Report and Written Opinion of the International Searching Authority dated Apr. 17, 2018; 9 pages.

"3rd Generation Partnership Project; Technical Specification Group Access Network; Evolved Universal Terrestrial Radio Access (E-UTRA); Multiplexing and Channel Coding (Release 13)," 3GPP TS 36.212, V13.0.0, Dec. 2015, 121 pages.

"LTE; Evolved Universal Terrestrial Radio Access (E-UTRA); Physical Channels and Modulation (3GPP TS 36.211 Version 13.0.0 Release 13)," ETSI TS 136.211, V13.0.0, Jan. 2016, 143 pages.

"LTE; Evolved Universal Terrestrial Radio Access (E-UTRA); Physical Layer Procedures (3GPP TS 36.213 Version 13.0.0 Release 13)," ETSI TS 136.213, V13.0.0, May 2016, 328 pages.

"LTE; Evolved Universal Terrestrial Radio Access (E-UTRA); Radio Resource Control (RRC); Protocol Specification (3GPP TS 36.331 Version 13.0.0 Release 13)," ETSI TS 136.331, V13.0.0, Jan. 2016, 670 pages.

* cited by examiner

METHOD AND APPARATUS FOR SYSTEM INFORMATION DELIVERY IN ADVANCED WIRELESS SYSTEMS

CROSS-REFERENCE TO RELATED APPLICATIONS AND CLAIM OF PRIORITY

The present application claims priority to U.S. Provisional Patent Application Ser. No. 62/442,237, filed on Jan. 4, 2017; U.S. Provisional Patent Application Ser. No. 62/507,924, filed on May 18, 2017; U.S. Provisional Patent Application Ser. No. 62/520,235, filed on Jun. 15, 2017; and U.S. Provisional Patent Application Ser. No. 62/556,293, filed on Sep. 8, 2017. The content of the above-identified patent document is incorporated herein by reference.

TECHNICAL FIELD

The present application relates generally to system information delivery in wireless communication systems. More specifically, this disclosure relates to system information block delivery and acquisition in next generation wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3X, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for system information transmission in a wireless communication system is provided. The UE comprises a transceiver configured to receive, from a base station (BS), a synchronization signal/physical broadcasting channel (SS/PBCH) block comprising a PBCH that carries a master information block (MIB) including an SIB1 CORESET configuration, wherein the SIB1 CORESET configuration comprises a frequency location, a number of resource blocks (RBs) comprising an SIB1 CORESET associated with the SS/PBCH block, and information of time domain resources of the SIB1 CORESET. The UE further comprises a processor configured to determine an initial active bandwidth part (BWP) comprising the frequency location, the number of RBs comprising the SIB1 CORESET, and a numerology of remaining minimum system information (RMSI). The UE further comprises the transceiver configured to receive, from the BS, a physical downlink control channel (PDCCH) mapped to at least one time-frequency resource within the SIB1 CORESET, wherein the PDCCH includes scheduling information of a physical downlink shared channel (PDSCH) containing an SIB 1.

In another embodiment, a BS for system information transmission in a wireless communication system is provided. The BS comprises a processor configured to determine an initial active BWP comprising a frequency location, a number of RBs comprising a SIB1 CORESET, and a numerology of RMSI. The BS further comprises a transceiver configured to transmit, to a UE, a SS/PBCH block comprising a PBCH that carries a MIB including an SIB1 CORESET configuration, wherein the SIB1 CORESET configuration comprises a frequency location, a number of RBs comprising an SIB1 CORESET associated with the SS/PBCH block, and information of time domain resources of the SIB1 CORESET, and transmit a PDCCH mapped to at least one time-frequency resource within the SIB1 CORESET, wherein the PDCCH includes scheduling information of a PDSCH containing an SIB 1.

In yet another embodiment, a method of a UE for system information transmission in a wireless communication system is provided. The method comprises receiving, from a BS, a SS/PBCH block comprising a PBCH that carries a MIB including an SIB1 CORESET configuration, wherein the SIB1 CORESET configuration comprises a frequency location, a number of RBs comprising an SIB 1 CORESET associated with the SS/PBCH block, and information of time domain resources of the SIB1 CORESET, determining an initial active BWP comprising the frequency location, the number of RBs comprising the SIB1 CORESET, and a numerology of RMSI, receiving, from the BS, a PDCCH mapped to at least one time-frequency resource within the SIB1 CORESET, wherein the PDCCH includes scheduling information of a PDSCH containing an SIB 1.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" and 3GPP TS 36.331 v13.0.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
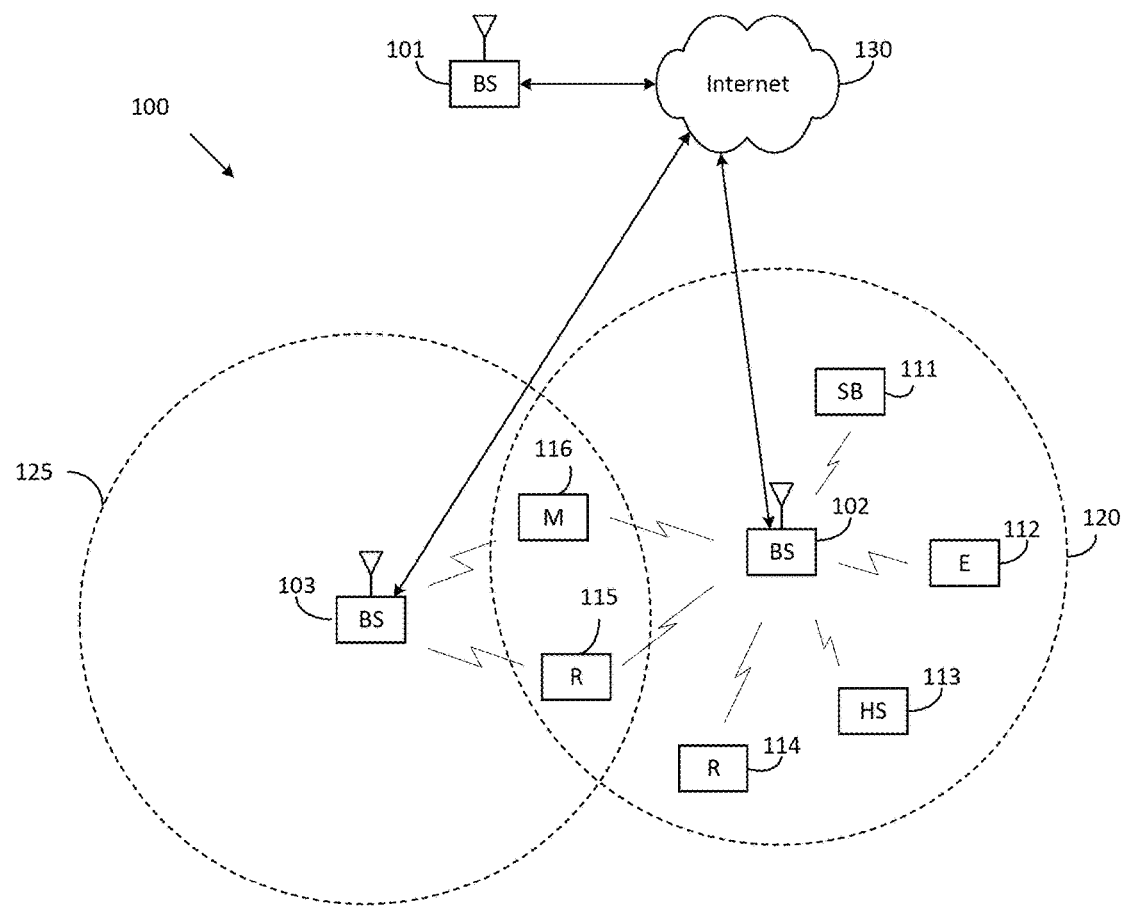
FIG. 1 illustrates an example wireless network according to embodiments of the present disclosure.
Figure 2:
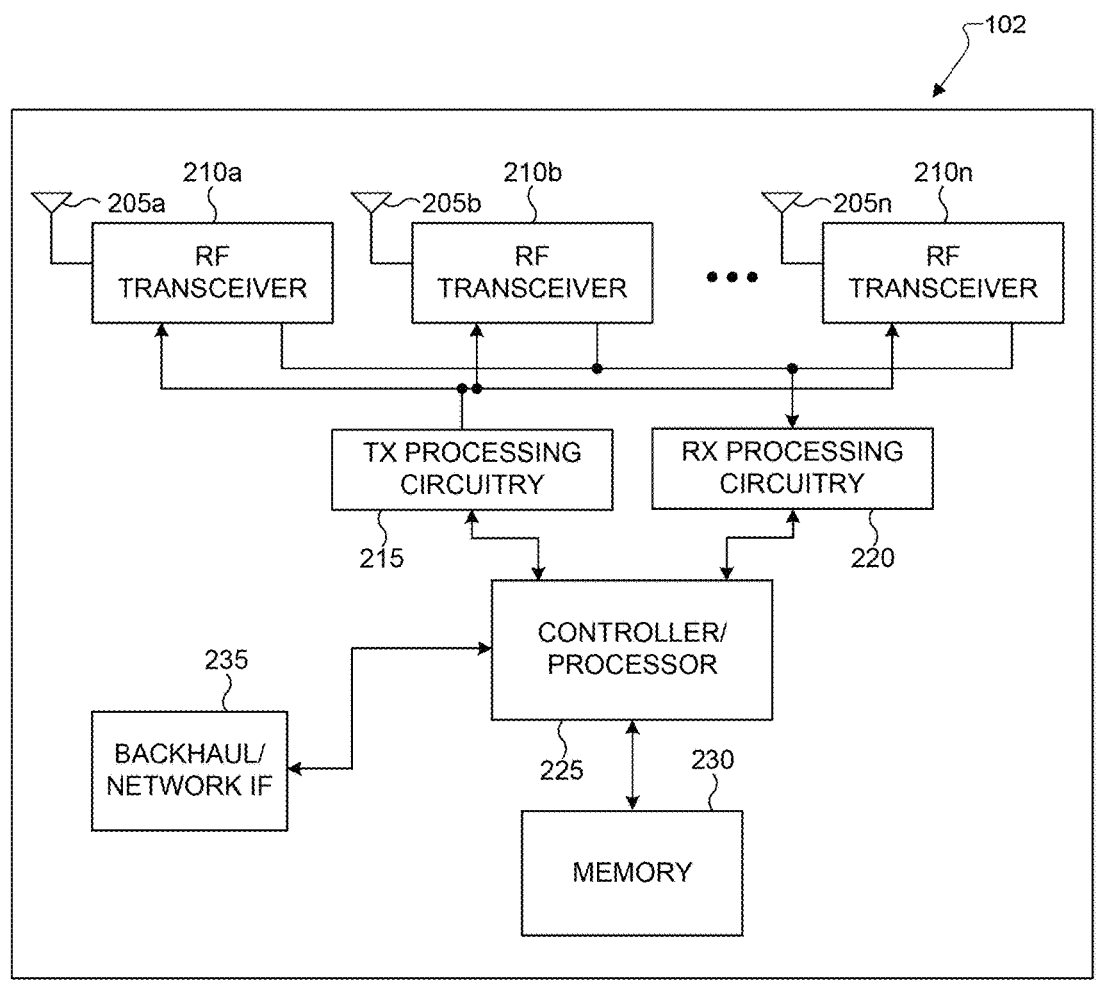
FIG. 2 illustrates an example eNB according to embodiments of the present disclosure.
Figure 3:
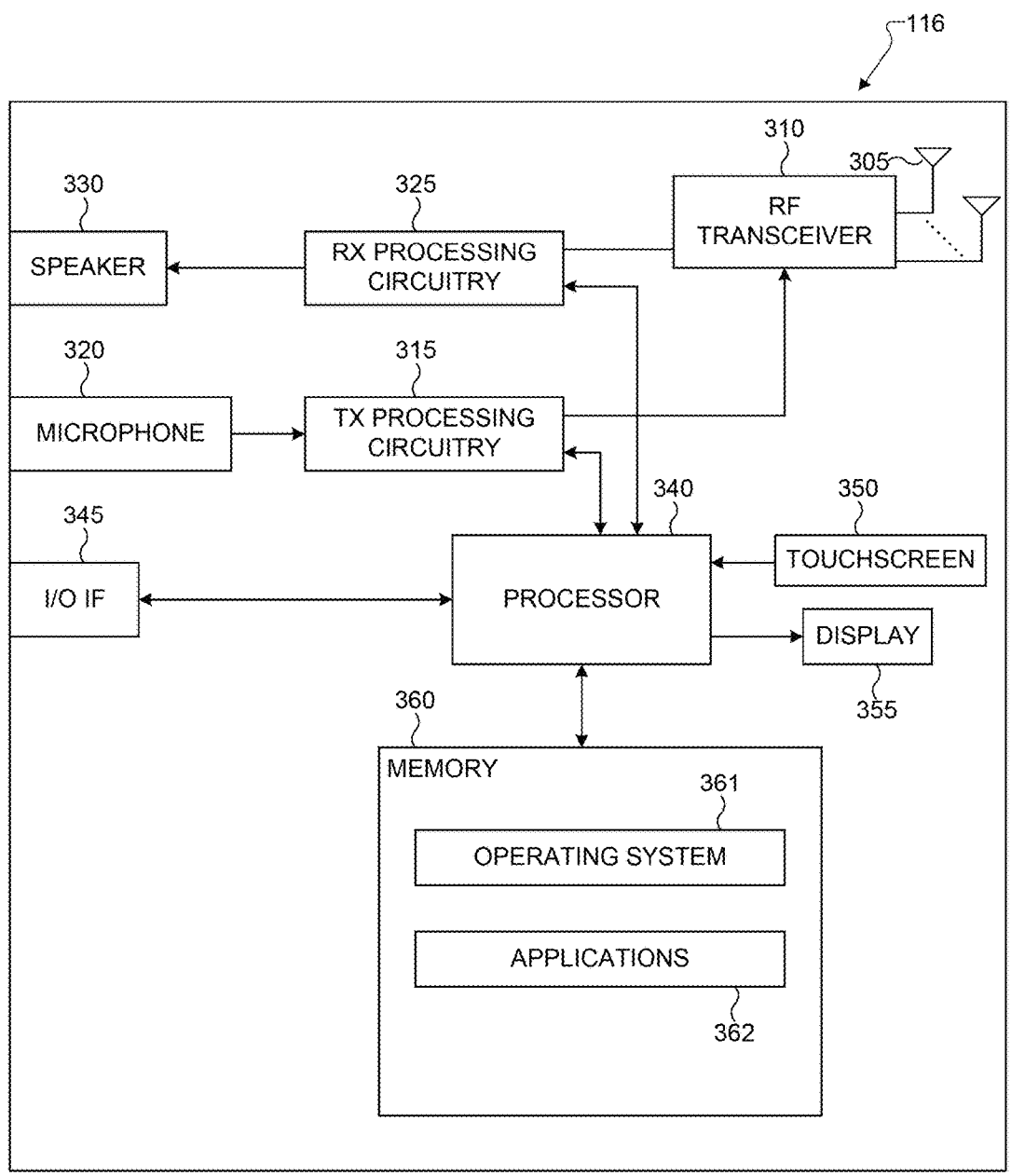
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA)

communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for system information delivery in an advanced wireless communication system. In certain embodiments, and one or more of the eNBs 101-103 includes circuitry, programming, or a combination thereof, for efficient system information delivery in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for system information delivery in an advanced wireless communication system. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
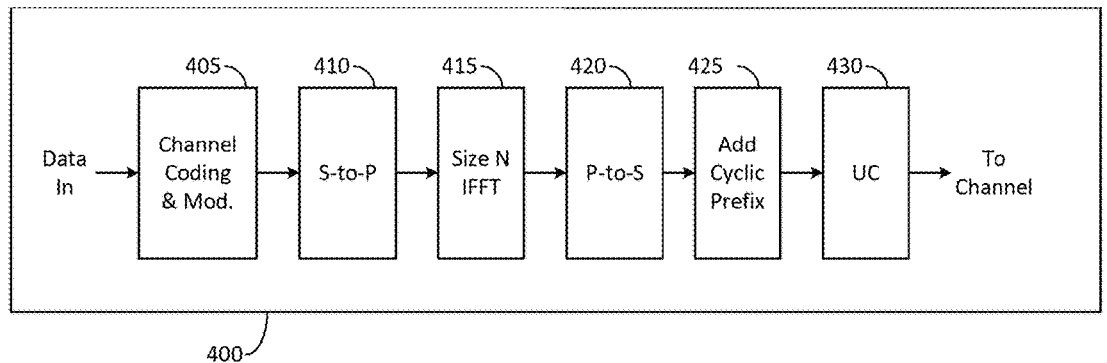
FIG. 4A illustrates an example high-level diagram of an orthogonal frequency division multiple access transmit path according to embodiments of the present disclosure.
Figure 4B:
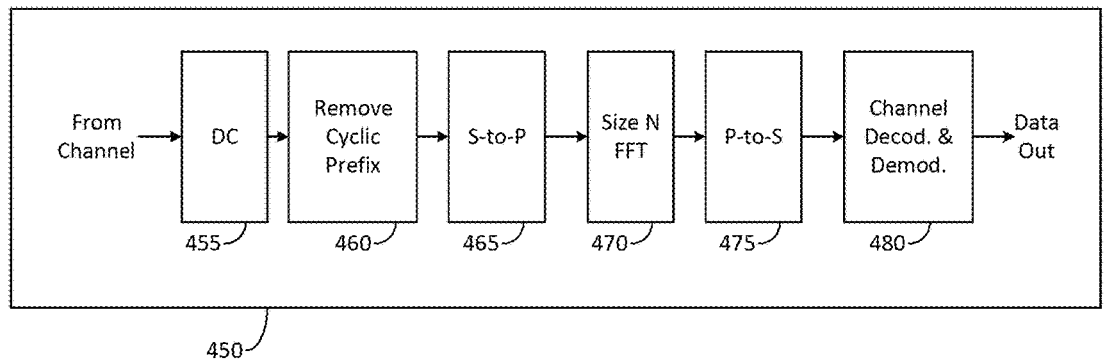
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in the BS 102 and the UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

Figure 5:
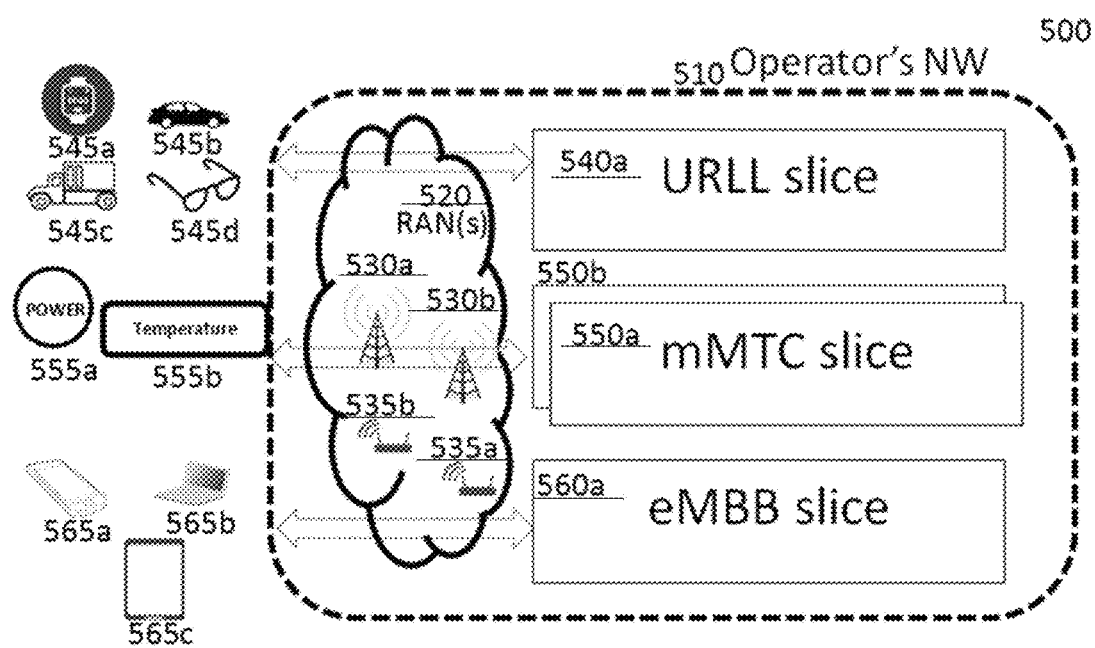
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

One device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
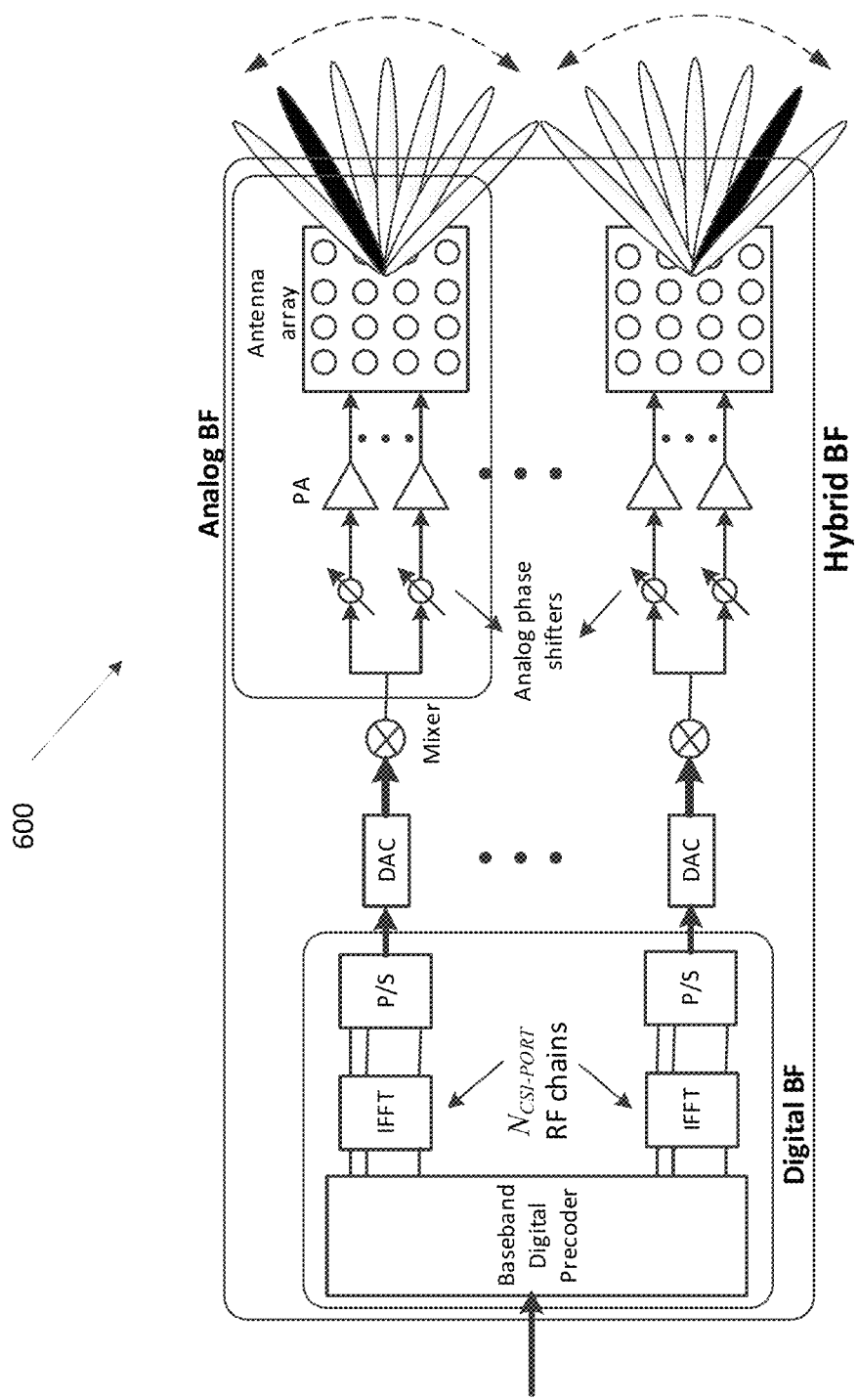
FIG. 6 illustrates an example number of digital chains according to embodiments of the present disclosure.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 6. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across symbols or subframes.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

A few embodiments to transmit the minimum system information transmission in an advanced communication is considered in the present disclosure.

In some embodiments, remaining minimum system information is transmitted via other channels at least partially indicated by NR-PBCH. In one example, the NR-PBCH carries a part of minimum system information including information necessary for the UE to receive channel carrying remaining minimum system information. In another example, the NR-PBCH carries information necessary for the UE to perform initial UL transmission (not limited to NR-PRACH, e.g. PRACH msg. 1) and possibly information necessary to receive the response to initial UL transmission (e.g., PRACH msg. 2) in addition to information in the aforementioned example.

In some embodiments, remaining minimum system information is transmitted via other channels not indicated in the NR-PBCH. In one example, the NR-PBCH carries information necessary for the UE to perform initial UL transmission (not limited to NR-PRACH, e.g. PRACH msg. 1) and information necessary to receive the response to initial UL transmission (e.g. PRACH msg. 2). In such example, information necessary to receive remaining minimum system information is provided after initial UL transmission.

In some embodiments, the NR-PBCH carries all of minimum system information.

In the LTE specifications, an MIB is periodically broadcast with 40 msec periodicity, SIB-1 is periodically broadcast with 80 msec periodicity, and SIB-2 is also periodically broadcast, whose periodicity is configured by SIB-1.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For time division duplex/frequency division duple (TDD/FDD) system with a bandwidth larger than 1.4 MHz that supports BL UEs or UEs in CE, MIB transmission may be repeated in subframe#9 of the previous radio frame for FDD and subframe #5 of the same radio frame for TDD.

Figure 7:
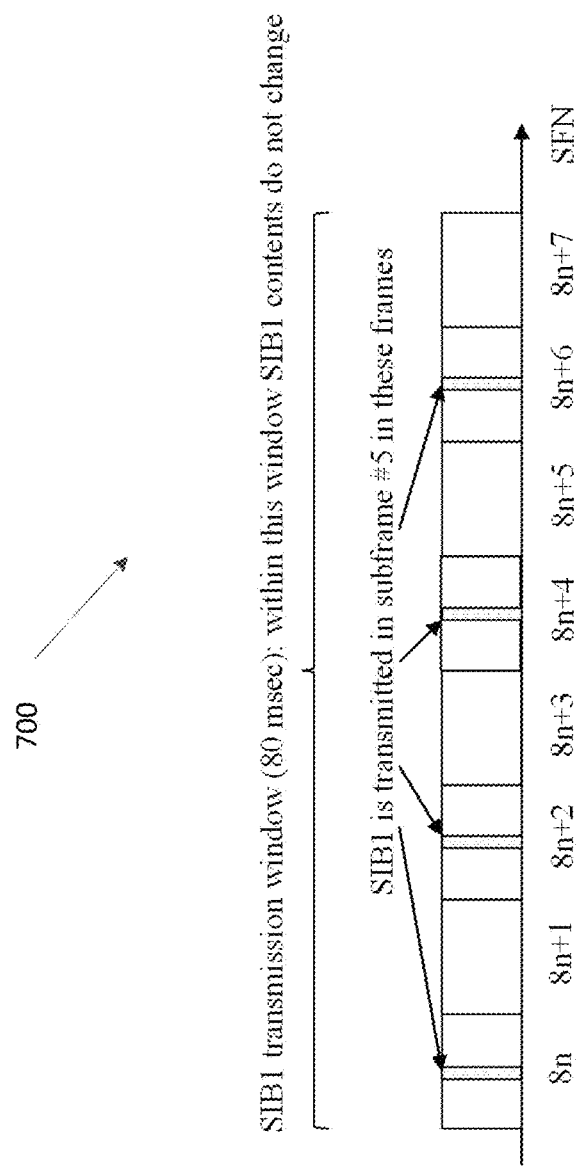
FIG. 7 illustrates an example system information block transmission according to embodiments of the present disclosure.

FIG. 7 illustrates an example system information block transmission 700 according to embodiments of the present disclosure. An embodiment of the system information block transmission 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0. The SIB1 transmission opportunities according to legacy LTE are illustrated in FIG. 7. The other SIBs can be transmitted in only those subframes which are not destined for SIB1 transmissions.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than MBSFN subframes, uplink subframes in TDD, and subframe #5 of radio frames for which SFN mod 2=0. The UE acquires the detailed time-domain scheduling (and other information, e.g. frequency-domain scheduling, used transport format) from decoding a system information radio network temporary identifier (SI-RNTI) on PDCCH.

For UEs other than BL UE or UEs in CE SI-RNTI is used to address SystemInformationBlockType1 as well as all SI messages. SystemInformationBlockType1 configures the SI-window length and the transmission periodicity for the SI messages.

In some embodiments, when acquiring an SI message, the UE may determine the start of the SI-window for the concerned SI message as follows. In one example, for the concerned SI message, the UE determines the number n which corresponds to the order of entry in the list of SI messages configured by schedulingInfoList in SystemInformationBlockType1. In another example, the UE determines the integer value x=(n−1)*w, where w is the si-WindowLength. In yet another example, the SI-window starts at the subframe #a, where a=x mod 10, in the radio frame for which SFN mod T=FLOOR(x/10), where T is the si-Periodicity of the concerned SI message. In such instance, a network may configure an SI-window of 1 ms only if all SIs are scheduled before subframe #5 in radio frames for which SFN mod 2=0.

In some embodiments, the UE receives DL-SCH using the SI-RNTI from the start of the SI-window and continue until the end of the SI-window whose absolute length in time is given by si-WindowLength, or until the SI message was received, excluding the following subframes: a subframe #5 in radio frames for which SFN mod 2=0; any MBSFN subframes; and/or any uplink subframes in TDD. If the SI message was not received by the end of the SI-window, repeat reception at the next SI-window occasion for the concerned SI message.

In the present disclosure, an SS burst set means a set of $N_1$ SS bursts; the SS burst set is periodically recurring with period P, where P is an integer, e.g., 5, 10, 20, 40, 80, etc. in terms of millisecond and $N_1$ is an integer, e.g., 1, 2 or 4. An SS burst means a set of consecutive $N_2$ SS blocks, where $N_2$ is an integer, e.g., 7, 14, 28, 56. An SS block comprises a combination of synchronization signals, broadcast signals, and reference signals, which are multiplexed in TDM, FDM, CDM or hybrid manner. A cell coverage is provided by a beam sweep over SS blocks comprising a burst set. Different TRP Tx beams may be used for different SS blocks within a burst set.

Figure 8:
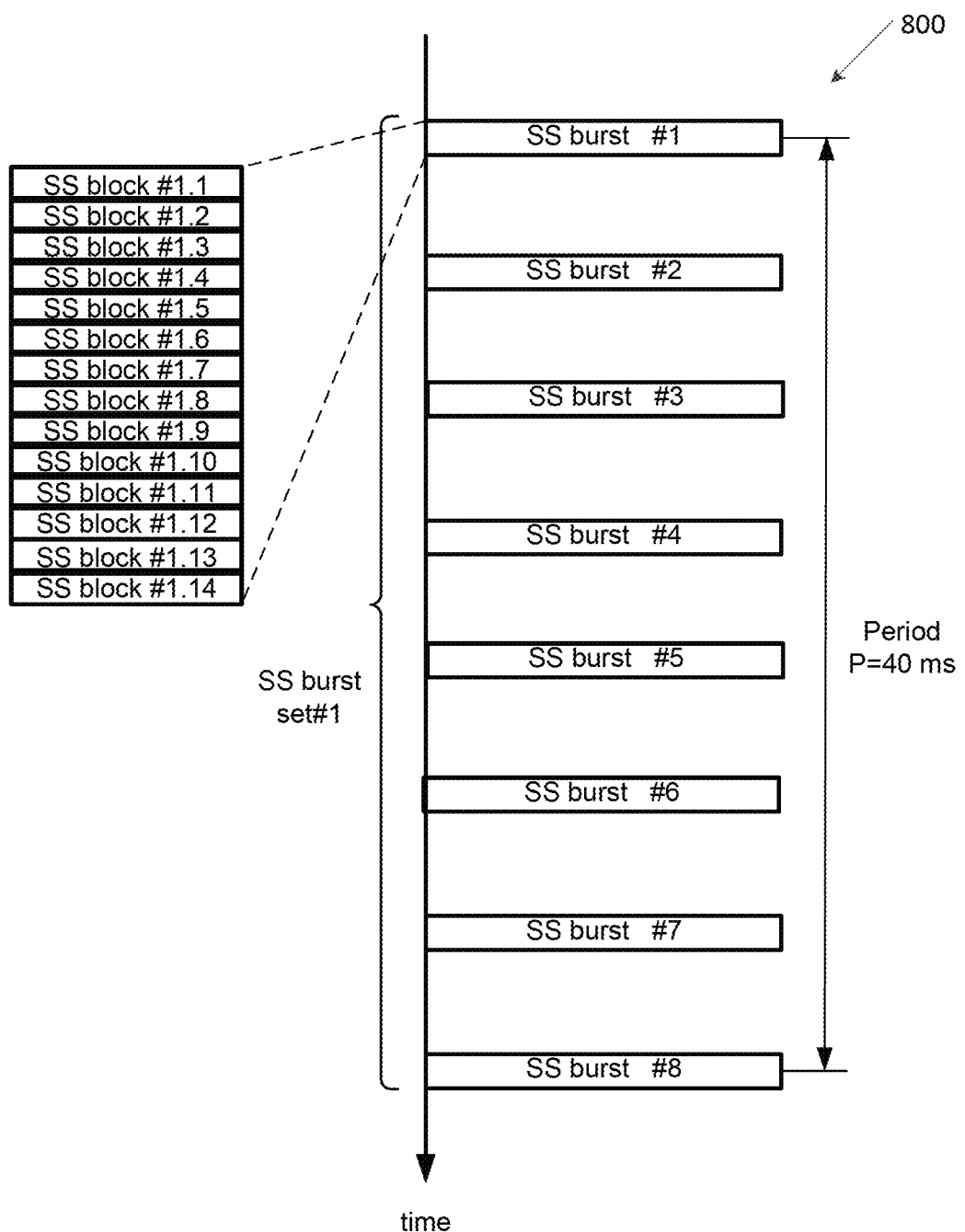
FIG. 8 illustrates an example SS block transmission according to embodiments of the present disclosure.

FIG. 8 illustrates an example SS block transmission 800 according to embodiments of the present disclosure. An embodiment of the SS block transmission 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In some embodiments, the SS burst set consists of eight SS burst and each SS burst consist of fourteen SS blocks, as illustrated in FIG. 8. One SS block consists of FDMed PSS, SSS, and ESS.

The present disclosure describes some schemes for transmitting remaining minimum system information (RMSI) and other SI in advanced wireless systems, in conjunction with multi-beam and single-beam operations.

The minimum SI can split into MIB (master information block) and RMSI (remaining minimum SI). The MIB is repeatedly transmitted on PBCH in each P-msec window, and the PBCH transmission windows are recurring periodically with periodicity P msec. The RMSI transmission opportunities may be predefined or indicated by an information element in MIB.

The RMSI transmission opportunities indicated in the MIB, denoted as RMSI resource configuration, may comprise one or more of the following parameters and the information can be separately or jointly coded.

The RMSI resource configuration comprises an RMSI window which is used to define an interval within which RMSI transmission may occur.

The RMSI resource configuration comprises a periodicity of RMSI transmissions (e.g., in terms of msec or in terms of number of radio frames), $P_{RMSI}$, which may also correspond to the RMSI window size. The RMSI is repeatedly transmitted within each RMSI window, and the RMSI contents are identical within the RMSI window. The RMSI window may also be referred to RMSI TTI.

The RMSI resource configuration comprises an RMSI time offset in terms of slots or msec, the time offset from the start of an RMSI window for the first occurrence of RMSI transmission in the RMSI window. In one example, given an RMSI time offset x (units of msec), and $P_{RMSI}$ is defined in units of radio frames, the RMSI transmission may occur within an RMSI window beginning at subframe x in a radio frame satisfying SFN mod $P_{RMSI}$=FLOOR (x/10)

The RMSI resource configuration comprises an RMSI burst size, i.e., number of consecutive slots or mini-slots (or CORESETs (control resource sets) and PDSCHs for RMSI) allocated for the RMSI transmission. The burst size can be greater than one for supporting multi-beam sweeping operation. When multi-beam sweeping may be performed either across multiple blocks of consecutive OFDM symbols comprising the burst, one beam per block, or across multiple mini-slots comprising the burst, one beam per mini-slot. A UE may assume that a set of antenna ports used for PDSCH (and PDCCH) in each block/mini-slot are QCL'ed in Rx beam/mode (spatial parameters), and other large scale parameters such as delay and Doppler. The RMSI burst size may be equal to the number of actually transmitted SS blocks. In such a case, the RMSI burst size may be implicitly indicated by the number of actually transmitted SS blocks;

or the number of actually transmitted SS blocks is implicitly indicated by the RMSI burst size.

The RMSI transmission comprises RMSI block length (or RMSI mini-slot length), i.e., the number of consecutive OFDM symbols (in reference/configured numerology) to comprise a mini-slot or a block. In this disclosure, "block" and "mini-slot" may mean the same and are used interchangeably. Note that an RMSI block may comprise time frequency resources for a CORESET and the PDSCH for the RMSI.

The RMSI resource configuration comprises RMSI block bandwidth (or RMSI mini-slot bandwidth), i.e., the bandwidth allocated for the mini-slots or blocks to be used for the RMSI transmissions.

The RMSI resource configuration comprises an RMSI duty cycle within each RMSI window (e.g., the time interval between two adjacent RMSI transmissions within an RMSI window. This field is valid only when the number of RMSI bursts in an RMSI window is greater than one.

The RMSI resource configuration comprises an RMSI-PDCCH indicator: one bit information to indicate the UE whether to search for PDCCH for receiving the RMSI transmissions or not. When the UE is indicated to search for PDCCH, the RMSI is transmitted on a PDSCH scheduled by the PDCCH, wherein the MCS and the PDSCH bandwidth (BW) are indicated by the PDCCH per slot (or per mini-slot or per block). When the UE is indicated not to search for PDCCH for RMSI reception, the RMSI is transmitted on a pre-defined BW and with a pre-defined MCS. For example, the pre-defined BW is the same as the system BW.

The RMSI resource configuration comprises MCS, PRB allocations; the MCS and PRBs to receive the PDSCH conveying the RMSI.

Some of those parameters, in the aforementioned examples, not explicitly configured by RMSI resource configuration can be pre-configured or indicated by PDCCH in each slot/mini-slot in RMSI burst. In such case, a first subset of those parameters listed above is pre-configured; a second subset is configured in MIB, and a third subset is indicated in the PDCCH; and the first and the second and the third subsets are mutually exclusive and the union of them is equal to the set of parameters.

Figure 9:
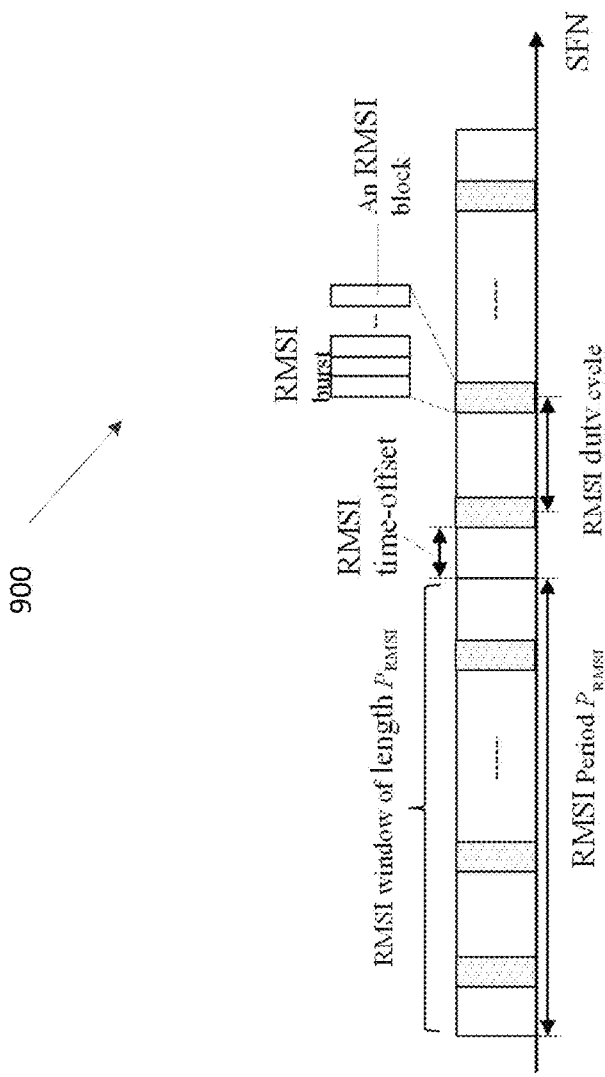
FIG. 9 illustrates an example RMSI transmission according to embodiments of the present disclosure.

FIG. 9 illustrates an example RMSI transmission 900 according to embodiments of the present disclosure. An embodiment of the RMSI transmission 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

The bit-width and contents of the RMSI resource configuration can be different for the different sets of carrier frequencies. A first set corresponds to carrier frequency ranges >6 GHz, e.g., 15 GHz, 28 GHz, 30 GHz, 60 GHz, etc., and the second set corresponds to carrier frequency ranges <6 GHz, e.g., 2, 3.5 and 4 GHz.

In some embodiments, if the carrier frequency belongs to the first set, the UE may assume the pre-configured RMSI reception resources; and if the carrier frequency belongs to the second set, the UE may decode PDCCH to get indication of the PDSCH BW and MCS for the RMSI.

In some embodiments, if the carrier frequency belongs to the first set, the UE may assume that x>0 bits are allocated to the RMSI resource configuration; else if the carrier frequency belongs to the second set, the UE may assume that 0 bits are allocated to the configuration. For the second case, the RMSI transmission occasions are pre-configured, and non-adaptable.

In some embodiments, if the carrier frequency belongs to the first set, the bit width for RMSI burst size is y>0 bits to indicate one number out of multiple candidates; if the carrier frequency belongs to the second set, the bit width is zero, in which case the RMSI burst size is equal to a pre-configured value, e.g., 1 time slot.

The scheduling information payload transmitted on NR-PBCH can be different for single-beam (the second set of carrier frequency) and multi-beam sweeping case (the first set). In both cases, some scheduling information may be pre-configured. For multi-beam sweeping case (the first set), PBCH indicates necessary PDSCH scheduling information for RMSI. For single-beam case (the second set), PBCH and PDCCH jointly indicate necessary PDSCH scheduling information for RMSI.

The RMSI can be transmitted on SS beam specifically, and the UE is configured to assume that the number of blocks or mini-slots allocated in each RMSI burst are identical to the number of SS blocks in a SS burst (or a SS burst set). The number of SS blocks can be pre-configured, or indicated in the MIB. In such a case, when the UE has detected SS/PBCH in SS block ID #n, the UE can attempt to decode the RMSI on the n-th RMSI block, and skip decoding the other RMSI blocks to save UE power consumption. For the n-th SS block and the n-th RMSI block, the UE may assume that those antenna ports in these two types of blocks are coherent, and QCL'ed in the large scale parameters, including Rx mode (spatial parameters), delay and Doppler spreads/parameters. On the other hand, for differently numbered SS block and RMSI block, a UE may not assume that those antenna ports are coherent; and UE may not assume that those antenna ports are QCL'ed.

Alternatively, the number of RMSI blocks in each RMSI burst can be configured to be less than the number of beams (or blocks) configured for an SS burst set. In such case, the UE may try to decode the RMSI across all the configured RMSI blocks in each RMSI burst. When the number of UEs is small, this scheme can be more efficient in terms of network power consumption and consume less system overhead. In this case, a UE may not assume that those antenna ports in RMSI blocks and SS blocks are coherent; and a UE may not assume that those antenna ports in these different blocks are QCL'ed.

The SIB-PDCCH/PDSCH (denoted as S-PxCH later in this disclosure) transmission opportunity can be configured utilizing similar set of parameters as the RMSI as shown in the aforementioned embodiments, but those parameters are indicated in RMSI rather than in MIB, and the contents are for SIB-PDSCH rather than for RMSI.

The S-PxCH can be transmitted on RMSI beam specifically, and the UE is configured to assume that a number of blocks or mini-slots allocated in each S-PxCH burst are identical to the number of RMSI blocks in an RMSI burst. In such a case, when a UE has detected RMSI in RMSI block #n, the UE can attempt to decode the S-PxCH on the n-th S-PxCH block, and skip decoding the other blocks to save UE power consumption. For the n-th RMSI block and the n-th S-PxCH block, the UE may assume that those antenna ports in these two types of blocks are coherent, and quasi-co-located (QCL'ed) in the large scale parameters, including Rx mode (spatial parameters), delay and Doppler spreads/parameters. On the other hand, for differently numbered RMSI block and S-PxCH block, the UE may not assume that those antenna ports are coherent; and the UE may not assume that those antenna ports in those different blocks are QCL'ed.

Alternatively, the number of S-PxCH blocks in each S-PxCH burst can be configured to be less than (in general, different from) the number of beams (or blocks) configured for an RMSI burst set. In such a case, the UE may try to decode the S-PxCH across all the configured S-PxCH blocks in each S-PxCH burst. When the number of UEs is small, this scheme can be more efficient in terms of network power consumption and consume less system overhead. In this case, the UE may not assume that those antenna ports in S-PxCH blocks and RMSI blocks are coherent; and the UE may not assume that those antenna ports are QCL'ed.

The numbers of RMSI/S-PxCH blocks in all the RMSI/S-PxCH bursts within an RMSI/S-PxCH window are identical. For the same RMSI/S-PxCH block position across different RMSI bursts (e.g., RMSI/S-PxCH block n across all the RMSI/S-PxCH bursts) within a RMSI/S-PxCH window, a UE may assume that TRP has applied the same beam. In such a case, the UE may assume that those antenna ports in these blocks are coherent, and QCL'ed in the large scale parameters, including Rx mode (spatial parameters), delay and Doppler spreads/parameters.

On the other hand, for differently numbered RMSI/S-PxCH blocks within and across RMSI/S-PxCH window(s), the UE may not assume that those antenna ports are coherent; and the UE may not assume that those antenna ports are QCL'ed.

For RMSI and/or SIB and/or paging transmission, a set of PDCCH search spaces (i.e., CORESETs) can be configured. The numerology used for the PDCCH transmissions is determined as a function of the default numerology. In case of up to 120 kHz numerology, PDSCH can be reliably transmitted; however, in case of 240 kHz numerology, PDSCH may not be able to be reliably transmitted. Hence, it is proposed to use the following mapping as shown in TABLE 1 between the default numerology and CORESET numerology for the RMSI/SIB. In the below table, frequency band A, B are defined in sub 6 GHz range; and C, D are defined in over 6 GHz range.

TABLE 1

Mapping information

| Frequency band | Default subcarrier spacing for SS blocks (kHz) | Subcarrier spacing for the common search space |
|---|---|---|
| A | 15 | 15 |
| B | 30 | 30 |
| C | 120 | 120 |
| D | 240 | 120 |

For enhancing the SS block coverage, a same beam can be used across multiple SS blocks. A UE default assumption is such that the beams used for different blocks are different. However, the UE can be indicated (in a broadcast signaling, e.g., in MIB) such that the UE can assume that SS blocks belonging to a group are transmitted using a same beam. In such a case, the UE can derive a SS block RSRP with averaging the measurements measured across the multiple SS blocks belonging to a same group.

For the QCL association between the SS blocks and CORESETs, either one-to-one mapping or many-to-one mapping can be used. The mapping relationship (i.e., either one-to-one or many-to-one) and/or related parameters (e.g., $J_{max}$ and/or $N_G$ whose definitions are as explained below) can be configured in a broadcast signaling, e.g., MIB.

When many-to-one mapping is configured, SS block group j is QCLed with RMSI block j, where=0, . . . , $J_{max}$−1, where $J_{max}$ is the total number of configured CORESETs (this corresponds to the number of SS block groups). In this case, the total number of (actually transmitted) SS blocks is equal to $N_G \cdot J_{max}$, where $N_G$ is number of SS blocks per SS block group.

The SS block indices belonging to group j is {(j−1)·$N_G$+0, 1, . . . , $N_G$−1}. When many-to-one mapping is configured, the UE can derive the SS block RSRP per SS block group. For the inter-cell measurement in the CONNECTED mode, the mapping relationship (i.e., either one-to-one or many-to-one) and/or related parameters (e.g., $J_{max}$ and/or $N_G$) can be configured in a dedicated signaling related to SS block based RSRP measurement.

When one-to-one mapping is configured, SS block j is QCLed with RMSI block (CORESET) j in a set of QCL parameters, where j=0, . . . , $J_{max}$−1, where $J_{max}$ is the total number of (actually transmitted) SS blocks. In this case, $N_G$=1. The length of the RMSI block can be jointly determined/indicated with the number of SS blocks per SS block group, i.e., $N_G$.

If the UE is indicated/configured to search for RMSI PDCCH, the cyclic redundancy check (CRC) which is associated with the scheduling downlink control information (DCI) may be scrambled with a specific RMSI-RNTI.

In some embodiments, if each RMSI block utilizes a different tx beam, a beam specific RMSI-RNTI is applied to the CRC generated for that DCI during NR-PDCCH scheduling that RMSI block. This is done so by setting the low order 6 bits of the RMSI_RNTI to equal the SS Block Time Index (0-6 bits) signaled in the MIB. This also requires that the tx beam used for the RMTI block is the same as the same tx beam used for the SS block corresponding to that time index. A UE tries to decode each RMTI block applying the corresponding SS block beam and the corresponding beam specific RMSI RNTI.

In another some embodiments, the CRC for the RMSI payload of RMSI Block #n is scrambled with the SS block time index for the associated SS Block, e.g., in terms of spatial QCL assumptions.

The RMSI CORESET(s) may be configured per SS burst set, or per SS burst, or per SS block.

If the RMSI CORESET(s) are configured per SS burst set, the RMSI scheduling information in the MIB is identical in the SS blocks comprising an SS burst set. In one embodiment, the RMSI scheduling information is determined by an offset delayed by the time resource of the SS block and the offset number is indicated within the MIB. In another embodiment, the RMSI scheduling information is indicated by an offset, in units of either radio frames or half radio frames, relative to the radio frame number of the SS burst set.

If the RMSI CORESET(s) are configured per SS burst, the RMSI scheduling information in the MIB is identical in the SS blocks comprising an SS burst; but the information can be different across the MIBs transmitted in different SS bursts comprising an SS burst set.

If the RMSI CORESET(s) are configured per SS block, the RMSI scheduling information in the MIB can be different in different SS blocks comprising an SS burst set. In one embodiment, a single RMSI CORESET is indicated in the MIB conveyed by an SS block. The time-frequency resource of the RMSI CORESET is determined solely by the MIB conveyed by the SS block. In such case, the time resource of the RMSI CORESET is offset delayed by the time resource of the SS block, and the offset number is indicated in the respective (beam-specific) MIB. The offset value can be indicated in terms of number of OFDM symbols, number of slots in the frame structure defined by the default (SS block) numerology, or alternatively by the configured RMSI numerology.

The beam-specific alternative may allow more efficient CORESET configuration, as only a single CORESET needs to be configured by individual SS-block specific MIB. Still, most of the CORESET configuration information is likely to be common across all the SS-blocks; but some information may be SS-block specific, e.g., the CORESET timing configuration. When compared to the other alternative in which the timing of all the CORESETs are configured in a batch, it can be seen that this alternative requires smaller MIB payload because only a single timing needs to be configured. This may also imply that the many-to-one mapping from SS-blocks to CORESETs to make QCL relations are handled by the network implementations, and no bits need to be spent for making the QCL relation. It may need to clarify that the configured CORESET by an SS block is QCL'ed with QCL parameters including the spatial parameters.

In some embodiments, a CORESET configuration in MIB in an SS block indicates a single CORESET in which PDCCH DMRS is QCL'ed with the SS block at least in spatial parameters. In such embodiment, different SS blocks may indicate different CORESETs.

In one embodiment, N candidate parameter value sets for CORESET mapping are hard coded in a table, and log 2(N) bit information to be carried in MIB indicates which one to be used. Each parameter value set comprises a subset of parameters discussed in embodiment 1, i.e., selected from CORESET periodicity, a CORESET time offset (either wrt a first SS block, or wrt a frame boundary), a CORESET burst size, a CORESET length (i.e., in terms of OFDM symbols), CORESET or RMSI/SIB BW super set (or alternatively denoted as PDSCH super set BW that may be assumed for the scheduling assignment in the PDCCH scheduling the PDSCH for SIB/RMSI) and CORESET duty cycle. The rest of the parameters that are not specified in the table either have a constant value; or configured explicitly using other field in the MIB.

In another embodiment, the CORESET BW, the PDSCH super set BW, and CORESET time locations are either jointly or separately indicated in the MIB.

The CORESET BW may be configured explicitly in the MIB (e.g., one BW selected from multiple candidate BWs within a carrier-specific minimum BW, i.e., minCH BW as shown in TABLE 2); or alternatively, the CORESET BW is configured/hard-coded to be the same as the SS block BW or the minimum BW of the carrier frequency. The motivation of the alternative CORESET BW allocation is to support both types of UEs, i.e., narrow-BW UEs and wide-BW UEs.

TABLE 2

| Multiple candidate BWs | | | |
|---|---|---|---|
| Frequency range | SCS (kHz) | Min CHBW (MHz) | Max CHBW (MHz) |
| Range 1 | 15 | 5 | 50 |
| Range 1 | 30 | Option 1: 5 MHz Option 2: 10 MHz | 100 |
| Range 1 | 60 | Option 1: 10 MHz Option 2: 20 MHz | 100 MHz |

TABLE 2-continued

| Multiple candidate BWs | | | |
|---|---|---|---|
| Frequency range | SCS (kHz) | Min CHBW (MHz) | Max CHBW (MHz) |
| Range 2 | 60 | 50 | 200 |
| Range 2 | 120 | 50 | 400 MHz |

A PDSCH super set BW can be configured to be wider than or equal to the CORESET BW. The RA field in the PDCCH configured in the CORESET is defined according to the PDSCH superset BW. Several alternatives to configure the PDSCH super set BW can be considered.

In some embodiments, the PDSCH super set BW is hard coded to be the same as CORESET BW.

In some embodiments, the PDSCH super set BW is indicated in the MIB.

In one such example, the indicated BW value is selected from (1) CORESET BW or the minimum BW in the frequency band (i.e., minCH BW); and (2) a minimum BW that narrow-BW UE supports in the frequency band. The minimum BW in (2) value may be specified by means of the minimum supported UE capability.

In the LTE specification, the minimum supported UE BW reception capability is 20 MHz; in NR the minimum supported UE BW reception capability can be more than the minimum BW of (1). This example is useful when the BW to be supported by minimum capability UE is wider than the CORESET BW in the frequency band, and when the bandwidth part supported by the network has wider than or equal to the minimum BW.

In another example, the indicated BW value is selected from (1) CORESET BW or the minimum BW in the frequency band; (2) a first BW; (3) a second BW; (4) a third BW. These examples give more flexibility to the network on how to configure the CORESET BW.

In yet another example, the indicated BW value is selected from (1) SS block BW; (2) 1× BW-part BW; (3) 2× BW-part BW; and/or (4) 4× BW-part BW.

The configuration of the BW of a BW part can be conducted in various schemes. In one alternative, the BW of a BW part is specified/hard-coded per carrier frequency band. In another alternative, the BW of a BW part is explicitly configured/indicated in MIB (or SIBx). In yet another alternative, each BW part is defined in terms of a subset of resource block groups (RBGs), when the system BW is partitioned into a set of RBGs, for which the RBGs are numbered according to a numbering scheme, wherein the RBG size for this purpose may be hard coded to be a constant integer, e.g., 1, 2, 3 RBs.

The BW of the BW part can be defined in terms of the number of RBGs. The candidate number of RBGs may be hard-coded and the UE may be indicated with one value in the MIB to determine the BW of the BW part. In the initial-access stage when the UE just obtain MIB, the UE does not know the system BW but the UE only knows the minimum BW (or SS block BW) around the decoded PBCH (or detected SS blocks). In such a case, the RBG indexing cannot be across the whole system BW.

Figure 10:
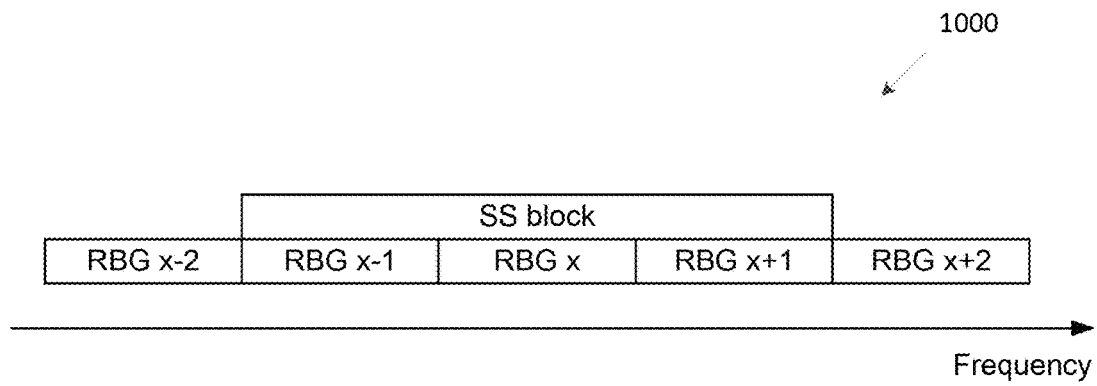
FIG. 10 illustrates an example RBG transmission according to embodiments of the present disclosure.

FIG. 10 illustrates an example RBG transmission 1000 according to embodiments of the present disclosure. An embodiment of the RBG transmission 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

In one example, an SS block BW center is numbered as RBG x; and other surrounding RBGs are indexed sequentially, with assigning integer values increased from x towards one ("plus") direction of frequency (i.e., x+1, x+2, . . . ); and with assigning integer values decreased from x towards the other ("minus") direction of frequency (i.e., x−1, x−2, . . . ) as shown in FIG. 10. In FIG. 10, the integer value x may be hard coded or indicated in the MIB.

The center frequency location of the BW part may be separately indicated in terms of the frequency offset (e.g., in terms of number of frequency resource units (e.g., RBGs number of subcarriers, RBs, etc.) towards either positive or negative directions) to the center frequency of the SS block. In one example, a UE may be indicated with an integer value y in the MIB, which can be either negative, positive or zero, so that the UE can identify the center RBG of the BW part to receive RMSI is determined to be x+y. The candidate values of y that can be indicated in the MIB may be hard coded per carrier frequency band.

Time domain CORESET location within a slot can be indicated in the MIB. The indicated information may include CORESET composition in each slot containing CORESET(s).

In one alternative, X candidate CORESET time locations in each slot to convey CORESETs (defined by SS block numerology or alternatively configured/indicated RMSI numerology) may be specified. Each candidate time location may be specified in terms of a set of OFDM symbol numbers; or alternatively in terms of the starting OFDM symbol number and the ending OFDM symbol number; or alternatively in terms of the starting OFDM symbol number and the number of OFDM symbols.

A UE may be indicated in MIB one selected from the X candidate CORESET time locations. One example CORESET time locations with X=4 is constructed in TABLE 3. According to TABLE 3, when the candidate number 0 is indicated a CORESET comprises one OFDM symbol, i.e., OFDM symbol 0; when the candidate number 1 is indicated, a CORESET comprises two OFDM symbols, i.e., OFDM symbol 0 and 1; and so on. The total number of slots to map CORESETs is implicitly determined by the number of CORESETs (or the number of SS blocks) indicated in the MIB; in one example, the total number of slots is the same as the number of CORESETs (or the number of SS blocks).

Note that the indicated number of the field in MIB is just for the illustration. In TABLE 3, a subset of entries, or the subset with different indices can be constructed without departing from the principle of the present disclosure.

TABLE 3

CORESET time location

| Indicated number of the field in MIB | An indicated set of OFDM symbol numbers | (Starting symbol number, number of symbols) | (starting symbol number, ending symbol number) |
|---|---|---|---|
| 0 | 0 | (0, 1) | (0, 0) |
| 1 | 0, 1 | (0, 2) | (0, 1) |
| 2 | 0, 1, 2 | (0, 3) | (0, 2) |
| 3 | 0, 1, 2, 3 | (0, 4) | (0, 3) |
| 4 | 1 | (1, 1) | (1, 1) |
| 5 | 2, 3 | (2, 2) | (2, 3) |

In some embodiments, both time slot offset (k) and OFDM symbol numbers are indicated in the beam-specific CORESET configuration in MIB. The time slot offset (k) may be indicated with respect to the time slot (n) of the detected SS block; or alternative, with respect to the frame boundary. The CORESET is located in the specified OFDM symbols in time slot n+k.

In some embodiments, a UE is indicated in MIB of (1) the number of CORESETs in each slot, $N_{CS}$; (2) the number of OFDM symbols per CORESET, $L_2$ and (3) the corresponding CORESET locations in the slot. In this case, the total number of slots to map the CORESETs $N_S$, is determined by the total number of CORESETs $N_C$, and the number of CORESETs in each slot, $N_{CS}$: in one method $N_S=N_C/N_{CS}$.

In some embodiments, the starting symbols of the CORESETs are determined as a function of (1) the number of CORESETs in each slot, $N_{CS}$; and (2) the number of OFDM symbols per CORESET, $L_2$. The candidate numbers for NCS are 1, 2, 4. The candidate numbers for L2 are 1, 2, and 3. These two numbers (1) and (2) may be jointly or separately indicated in the MIB. Alternatively, one of these two numbers is explicitly indicated while the other number is hard coded in the spec. In one example, one of these two numbers is explicitly indicated while the other number is implicitly indicated. For example, the number of CORESETs in each slot is implicitly determined as a function of number of SS bursts. In such case, the number of CORESETs in each slot is the same as the number of SS bursts. In such case, a UE identifies the number of CORESETs in each slot utilizing a mapping table between the number of CORESETs in each slot and the number of SS bursts.

Figure 11:
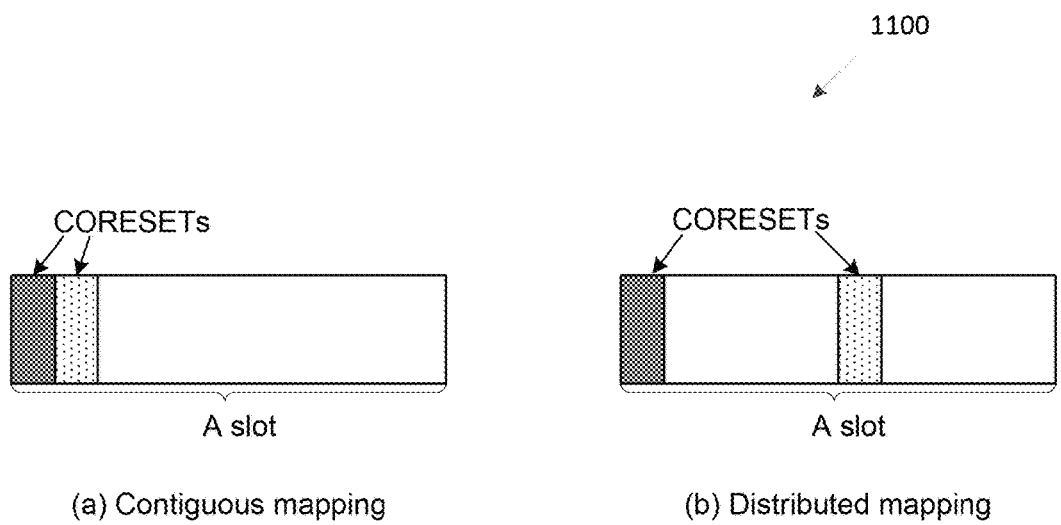
FIG. 11 illustrates an example CORESET transmission in continuous and distributed mapping according to embodiments of the present disclosure.

FIG. 11 illustrates an example CORESET transmission 1100 in continuous and distributed mapping according to embodiments of the present disclosure. An embodiment of the CORESET transmission 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

The CORESETs in a slot can be mapped in either distributed or contiguous manner. When the $N_{CS}$ CORESETs are distributed across symbols in a slot, the starting symbol of the CORESET i is determined as $(i-1)*L_1$ where i=0, 1, . . . , $N_{CS}-1$ and $L_1$ is an integer that specifies the symbol spacing between the two consecutive CORESETs. In one example, $L_1=L/N_{CS}$ where L is the number of symbols in a slot. For example, when L=14 and $N_{CS}=2$, $L_1=7$. When the $N_{CS}$ CORESETs are contiguous across symbols in a slot, the starting symbol of the CORESET i is determined as $(i-1)*L_2$, where i=0, 1, . . . , $N_{CS}-1$. A UE may get indicated in MIB whether to use distributed or consecutive CORESET mapping for receiving the PDCCHs. These two CORESET mapping methods are illustrated in FIG. 11.

According to the aforementioned embodiments, the $N_{CS}$ CORESETs are mapped each slot. There could be various methods to determine the identities of the CORESETs to be mapped to the s-th slot used for the CORESET mapping for the common search space (this can be the same as an RMSI burst or an RMSI burst set), where s=1, 2, . . . , $N_S$. In one example, on the s-th slot, CORESETs $\{(s-1)*N_{CS}, \ldots, s*N_{CS}-1\}$ are sequentially mapped in the time domain. In another method, i-th CORESET in the s-th slot corresponds to an s-th CORESET in SS burst i.

The slots to be used for the CORESET can be every Z slots, or every frame, etc., wherein Z=1, 2, . . . . One selected CORESET mapping scheme out of some of these candidate scheme can be indicated in MIB. For this purpose, the number Z may be indicated in MIB. Some of these parameters to indicate for the time domain configuration of CORESETs may be indicated in MIB: number of CORESETs per slot ($N_{CS}$); number of OFDM symbols per CORESET ($L_2$); distributed vs. contiguous mapping of CORESETs in a slot; and CORESET slot duty cycle (Z)

In some embodiments, the frequency domain mapping of MIB configured CORESETs and RMSI PDSCH, numerology of RMSI, and multiplexing scheme of CORESET/PDSCH and SS blocks are determined.

In some embodiments, for frequency location of CORESET for RMSI scheduling and NR-PDSCH for RMSI, CORESET for RMSI scheduling and NR-PDSCH for RMSI may not be confined within the same BW of corresponding NR-PBCH and bandwidth for CORESET and NR-PDSCH for RMSI is confined within the UE minimum bandwidth for the given frequency band. In some embodiments, the single DL numerology to be used at least for RMSI, Msg.2/4 for initial access and broadcasted OSI is informed in NR-PBCH payload. In such embodiments, a numerology is used for paging, Msg.2/4 for other purposes, and on-demand OSI. In some embodiments, it is determined whether NR supports FDM between SS/PBCH block and CORESET/NR-PDSCH. In some embodiments, CORESET is designed at least for TDM.

To minimize fragmentation of the resources, it would be desirable to confine these signals to be transmitted with the MIB configured numerology, i.e., MIB configured CORESET, RMSI, RMSI configured CORESET, msg2/4 for initial access, broadcast OSI, etc. in a localized time-frequency resource. In particular, for the frequency domain, the BW to transmit these signals could comprise a single BW whose BW size is less than the UE minimum BW. Now the remaining issue is whether to additionally support configuration of the single BW separately from the UE minimum BW which encompassing the SS block BW.

It seems that the FDM can be supported by configure the frequency location for the single BW in terms of frequency offset to the SS block BW. If the candidate frequency offset values to be indicated in the MIB includes "0" and other values corresponding to BWPs non-overlapping with the SS block BW, then both TDM and FDM of the SS block and the single BW may naturally be supported.

A single BW is configured in MIB by means of a frequency offset. The single BW is to transmit these signals according to the MIB configured numerology, i.e., MIB configured CORESET, RMSI, RMSI configured CORESET, msg2/4 for initial access, broadcast OSI, etc. This single BW can be accessed in both IDLE and CONNECTED mode, to receive these signals. In one example, the candidate values to indicate the frequency offset include at least "0," and other values that corresponds to BWPs non-overlapping with the SS block BW. In another example, the number of bits for the frequency offset is limited to 2 bits.

Figure 12:
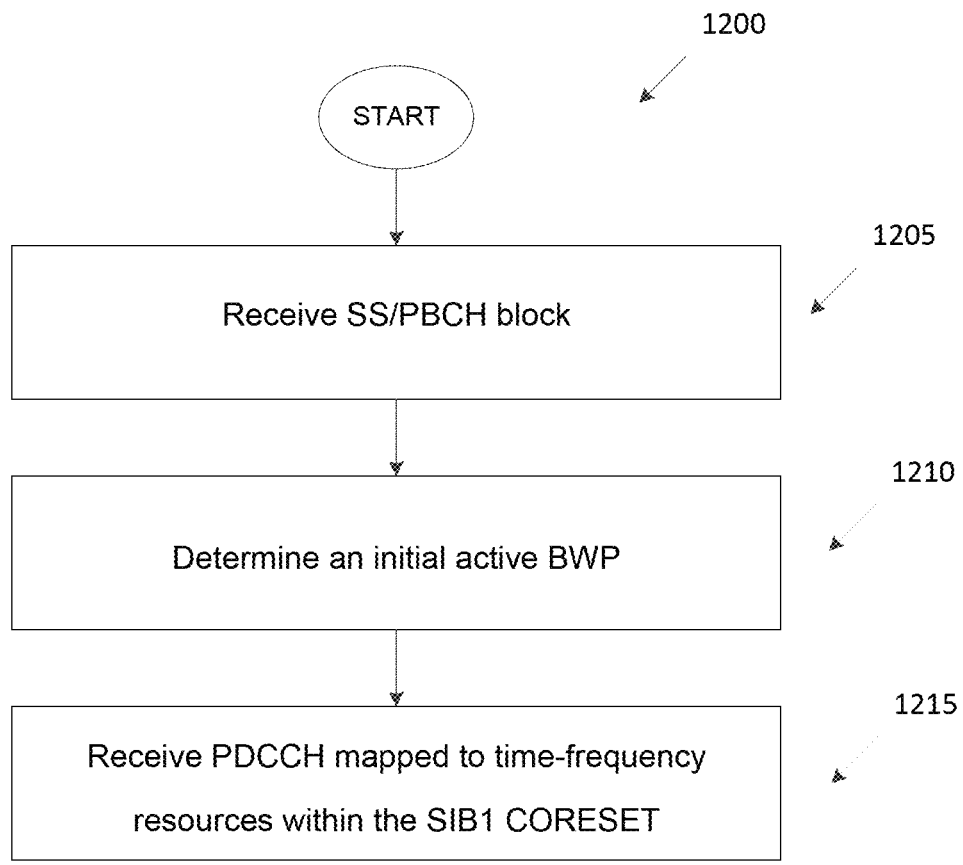
FIG. 12 illustrates a flow chart of a method for system information delivery according to embodiments of the present disclosure.

FIG. 12 illustrates a flow chart of a method 1200 for system information delivery, as may be performed by a UE, according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, the method 1200 begins at step 1205. In step 1205, the UE receives, from a BS, a SS/PBCH block comprising a PBCH that carries a MIB including an SIB1 CORESET configuration. In step 1205, the SIB1 CORESET configuration comprises a frequency location, a number of RBs comprising an SIB1 CORESET associated with the SS/PBCH block, and information of time domain resources of the SIB1 CORESET. In some embodiments, the information of time domain resources of the SIB1 CORESET includes a number of consecutive symbols for the SIB1 CORESET. In some embodiments, the SIB1 CORESET configuration further comprises information to indicate a number of SIB1 CORESETs in each slot, a candidate value of the number of SIB 1 CORESETs is determined as either 1 or 2. In some embodiments, the SIB1 CORESET configuration further comprises information to indicate a starting OFDM symbol number of the SIB1 CORESET.

Subsequently, the UE in step 1210 determines an initial active BWP comprising the frequency location, the number of RBs comprising the SIB1 CORESET, and a numerology of RMSI. In some embodiments, the frequency location of the SIB1 CORESET is configured by a frequency offset of the SIB1 CORESET bandwidth from the frequency location of the SS/PBCH block, the frequency offset being indicated in the MIB.

Finally, the UE in step 1215 receives a PDCCH mapped to at least one time-frequency resource within the SIB1 CORESET. In step 1215, the PDCCH includes scheduling information of a PDSCH containing an SIB 1. In some embodiments, the PDSCH delivering the SIB1 is confined within the initial active BWP. In some embodiments, the UE in step 1215 uses a Rx beam to receive the SIB1 CORESET based on a reception scheme of the SS/PBCH block.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for system information transmission in a wireless communication system, the UE comprising:

a transceiver configured to receive, from a base station (BS), a synchronization signal/physical broadcasting channel (SS/PBCH) block that carries a master information block (MIB) including a configuration of a control resource set (CORESET) for a type 1 system information block (SIB1), wherein the SIB1 CORESET configuration comprises a frequency location, a number of resource blocks (RBs), and information of time domain resources of the SIB1 CORESET; and a processor configured to determine an initial active bandwidth part (BWP) comprising the frequency location, the number of RBs comprising the SIB1 CORESET, and a numerology of remaining minimum system information (RMSI), wherein the transceiver is further configured to receive, from the BS, a physical downlink control channel (PDCCH) mapped to at least one time-frequency resource within the SIB1 CORESET, the PDCCH including scheduling information of a physical downlink shared channel (PDSCH) containing the SIB1.

2. The UE of claim 1, wherein the frequency location of the SIB1 CORESET is configured by a frequency offset from a frequency location of the SS/PBCH block, the frequency offset being indicated in the MIB.

3. The UE of claim 1, wherein the PDSCH containing the SIB1 is confined within the initial active BWP.

4. The UE of claim 1, wherein the information of time domain resources of the SIB1 CORESET includes a number of consecutive symbols for the SIB1 CORESET.

5. The UE of claim 1, wherein the SIB1 CORESET configuration further comprises information to indicate a number of SIB1 CORESETs in each slot, and wherein a candidate value of the number of SIB1 CORESETs is either 1 or 2.

6. The UE of claim 1, wherein the SIB1 CORESET configuration further comprises information to indicate a number for a starting orthogonal frequency division multiplexing (OFDM) symbol of the SIB1 CORESET.

7. The UE of claim 1, wherein the processor is further configured to use a receive (Rx) beam to receive the SIB1 CORESET based on a reception scheme of the SS/PBCH block.

8. A base station (BS) for system information transmission in a wireless communication system, the BS comprising:
 a processor configured to determine an initial active bandwidth part (BWP) comprising a frequency location, a number of resource blocks (RBs) comprising a control resource set (CORESET) for a type 1 system information block (SIB1), and a numerology of remaining minimum system information (RMSI); and
 a transceiver configured to:
  transmit, to a user equipment (UE), a synchronization signal/physical broadcasting channel (SS/PBCH) block that carries a master information block (MIB) including a configuration of the SIB1 CORESET, wherein the SIB1 CORESET configuration comprises a frequency location, a number of RBs, and information of time domain resources of the SIB1 CORESET, and
  transmit a physical downlink control channel (PDCCH) mapped to at least one time-frequency resource within the SIB1 CORESET, wherein the PDCCH includes scheduling information of a physical downlink shared channel (PDSCH) containing the SIB1.

9. The BS of claim 8, wherein the frequency location of the SIB1 CORESET is configured by a frequency offset from a frequency location of the SS/PBCH block, the frequency offset being indicated in the MIB.

10. The BS of claim 8, wherein the PDSCH containing the SIB1 is confined within the initial active BWP.

11. The BS of claim 8, wherein the information of time domain resources of the SIB1 CORESET includes a number of consecutive symbols for the SIB1 CORESET.

12. The BS of claim 8, wherein the SIB1 CORESET configuration further comprises information to indicate a number of SIB1 CORESETs in each slot, and wherein a candidate value of the number of SIB1 CORESETs is either 1 or 2.

13. The BS of claim 8, wherein the SIB1 CORESET configuration further comprises information to indicate a number of a starting orthogonal frequency division multiplexing (OFDM) symbol of the SIB1 CORESET.

14. A method of user equipment (UE) for system information transmission in a wireless communication system, the method comprising:
 receiving, from a base station (BS), a synchronization signal/physical broadcasting channel (SS/PBCH) block that carries a master information block (MIB) including a configuration of a control resource set (CORESET) for a type 1 system information block (SIB1), wherein the SIB1 CORESET configuration comprises a frequency location, a number of resource blocks (RBs), and information of time domain resources of the SIB1 CORESET;
 determining an initial active bandwidth part (BWP) comprising the frequency location, the number of RBs comprising the SIB1 CORESET, and a numerology of remaining minimum system information (RMSI); and
 receiving, from the BS, a physical downlink control channel (PDCCH) mapped to at least one time-frequency resource within the SIB1 CORESET, wherein the PDCCH includes scheduling information of a physical downlink shared channel (PDSCH) containing the SIB1.

15. The method of claim 14, wherein the frequency location of the SIB1 CORESET is configured by a frequency offset from a frequency location of the SS/PBCH block, the frequency offset being indicated in the MIB.

16. The method of claim 14, wherein the PDSCH containing the SIB1 is confined within the initial active BWP.

17. The method of claim 14, wherein the information of time domain resources of the SIB1 CORESET includes a number of consecutive symbols for the SIB1 CORESET.

18. The method of claim 14, wherein the SIB1 CORESET configuration further comprises information to indicate a number of SIB1 CORESETs in each slot, and wherein a candidate value of the number of SIB1 CORESETs is either 1 or 2.

19. The method of claim 14, wherein the SIB1 CORESET configuration further comprises information to indicate a number of a starting orthogonal frequency division multiplexing (OFDM) symbol of the SIB1 CORESET.

20. The method of claim 14, further comprising using a receive (Rx) beam to receive the SIB1 CORESET based on a reception scheme of the SS/PBCH block.

* * * * *